US008380570B2

(12) United States Patent
Agarwal et al.

(10) Patent No.: US 8,380,570 B2
(45) Date of Patent: Feb. 19, 2013

(54) INDEX-BASED TECHNIQUE FRIENDLY CTR PREDICTION AND ADVERTISEMENT SELECTION

(75) Inventors: Deepak K. Agarwal, Sunnyvale, CA (US); Joaquin Arturo Delgado Rodriguez, Santa Clara, CA (US); Marcus Fontoura, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 598 days.

(21) Appl. No.: 12/606,400

(22) Filed: Oct. 27, 2009

(65) Prior Publication Data

US 2011/0099059 A1   Apr. 28, 2011

(51) Int. Cl.
    *G06Q 30/00*      (2012.01)
(52) U.S. Cl. ............... 705/14.4; 705/14.41; 705/14.43; 705/14.53; 705/14.54
(58) Field of Classification Search .................. None
    See application file for complete search history.

(56) References Cited

U.S. PATENT DOCUMENTS

| | | | |
|---|---|---|---|
| 2003/0095140 A1* | 5/2003 | Keaton et al. ............... 345/700 |
| 2005/0144065 A1* | 6/2005 | Calabria et al. ............... 705/14 |
| 2005/0251444 A1* | 11/2005 | Varian et al. ............... 705/14 |
| 2006/0053110 A1 | 3/2006 | McDonald et al. |
| 2007/0027751 A1* | 2/2007 | Carson et al. ............... 705/14 |
| 2007/0027865 A1* | 2/2007 | Bartz et al. ............... 707/5 |
| 2007/0033105 A1* | 2/2007 | Collins et al. ............... 705/14 |
| 2007/0112840 A1 | 5/2007 | Carson et al. |
| 2007/0192241 A1* | 8/2007 | Metlapalli ............... 705/38 |
| 2007/0214132 A1* | 9/2007 | Grubb et al. ............... 707/5 |
| 2008/0033826 A1* | 2/2008 | Maislos et al. ............... 705/14 |
| 2008/0065479 A1* | 3/2008 | Tomlin et al. ............... 705/14 |
| 2008/0104026 A1* | 5/2008 | Koran ............... 707/3 |
| 2008/0133314 A1* | 6/2008 | Chiu ............... 705/10 |
| 2008/0154858 A1* | 6/2008 | Manavoglu et al. ............... 707/3 |
| 2008/0183561 A1* | 7/2008 | Zohar et al. ............... 705/10 |
| 2008/0255915 A1* | 10/2008 | Collins et al. ............... 705/8 |
| 2008/0288348 A1* | 11/2008 | Zeng et al. ............... 705/14 |
| 2008/0306815 A1* | 12/2008 | Dykes et al. ............... 705/14 |
| 2008/0319973 A1* | 12/2008 | Thambiratnam et al. ......... 707/5 |
| 2009/0043649 A1* | 2/2009 | Wright et al. ............... 705/14 |
| 2009/0076794 A1* | 3/2009 | Achan et al. ............... 704/9 |
| 2009/0099984 A1 | 4/2009 | Zhu et al. |
| 2009/0125444 A1* | 5/2009 | Cochran et al. ............... 705/50 |
| 2009/0144207 A1* | 6/2009 | Dominowska et al. ....... 705/400 |
| 2009/0210290 A1* | 8/2009 | Elliott et al. ............... 705/10 |
| 2009/0271257 A1* | 10/2009 | Flake et al. ............... 705/14 |
| 2010/0049584 A1* | 2/2010 | Mehta et al. ............... 705/10 |
| 2010/0088152 A1* | 4/2010 | Bennett ............... 705/10 |

(Continued)

OTHER PUBLICATIONS

U.S. Appl. No. 12/474,668, filed May 29, 2009, Chen et al.

*Primary Examiner* — Matthew T Sittner
(74) *Attorney, Agent, or Firm* — Mauriel Kapouytian & Treffert LLP; James Woods; Nirav Amin

(57) ABSTRACT

Methods and systems are provided for click through rate prediction and advertisement selection in online advertising. Methods are provided in which output information from a feature-based machine learning model is utilized. The output information includes predicted click through rate information. The output information is used to form a matrix. The matrix is modeled using a latent variable model. Machine learning techniques can be used in determining values for unfilled cells of one or more model matrices. The latent variable model can be used in determining predicted click through rate information, and in advertisement selection in connection with serving opportunities.

20 Claims, 4 Drawing Sheets

U.S. PATENT DOCUMENTS

| | | |
|---|---|---|
| 2010/0100416 A1* | 4/2010 | Herbrich et al. ................ 705/10 |
| 2010/0114654 A1* | 5/2010 | Lukose et al. .................. 705/10 |
| 2010/0121671 A1* | 5/2010 | Boutilier et al. ................. 705/8 |
| 2010/0138291 A1* | 6/2010 | Silverman et al. ......... 705/14.45 |
| 2010/0198679 A1* | 8/2010 | Kassakian et al. ......... 705/14.42 |
| 2010/0198685 A1* | 8/2010 | Bayati et al. .............. 705/14.52 |
| 2010/0198772 A1* | 8/2010 | Silverman et al. ............. 706/52 |
| 2010/0262499 A1* | 10/2010 | Karlsson et al. ........... 705/14.72 |
| 2011/0015988 A1* | 1/2011 | Wright et al. ............. 705/14.42 |
| 2011/0040635 A1* | 2/2011 | Simmons et al. .......... 705/14.71 |
| 2011/0060736 A1* | 3/2011 | Bailey et al. .................. 707/727 |
| 2011/0099059 A1* | 4/2011 | Agarwal et al. ............ 705/14.43 |
| 2011/0238495 A1* | 9/2011 | Kang ......................... 705/14.49 |

* cited by examiner

INDEX-BASED TECHNIQUE FRIENDLY CTR PREDICTION AND ADVERTISEMENT SELECTION

BACKGROUND

Modern large-scale information retrieval techniques often use index-based techniques. Indexing and indexing-based techniques can allow offline processing that can greatly speed information retrieval. This can be of great value in applications such as online advertising or search, where results or advertisements may need to be determined in just a small fraction of a second. In some techniques, particular elements or items of a match, such as content of a Web page or content of advertising, are indexed. Matrices can be formed using indexed information. Indexing techniques can then be applied, such as techniques that utilize inner product matrix multiplication to compute or help compute, for example, associations, matches, strengths of associations or matches, or corresponding scores. Such techniques may be used, for example, in determining a top set of advertisements that match a particular serving opportunity, such as advertisements, including creatives, that best match a keyword query, Web site content, using or other targeting information, etc.

Performance parameters associated with advertising and other content, such as click through rate, are critical for many uses and applications. Furthermore, predicted click through rates for particular situations that arise in real time can be critical for optimal matching. For example, in advertising applications, predicted performance of an advertisement in a given context, such as predicted click through rate, is often used in determining a good or optimal set of advertisements to serve in relation to a given serving opportunity. For instance, in sponsored search, the rank of an advertisement may be determined by an associated bid amount multiplied by an associated determined predicted click through rate (perhaps in combination with other parameters or factors, etc).

Machine learning techniques can be of great value in information retrieval, including determining top matches. For example, in advertising, machine learning techniques are often used in determining a top set of matches between advertisements and a serving opportunity. For example, machine learning can be used to determine strength of matching between new sets of items, based on features, such as content-based features, relating to such items. Training sets of collected historical information can be used to train a machine learning model, which model can then be applied to new situations and sets or combinations of items. For example, machine learning techniques can be used to determine predicted click through rates associated with matches. However, use of existing machine learning models on new situations can be computationally intensive and time-consuming.

There is a need for faster and more efficient methods and systems for determining predicted click through rate and top sets of matched items such as advertisements.

SUMMARY

Some embodiments of the invention provide methods and systems for click through rate prediction and advertisement selection in online advertising. Methods are provided in which output information from a feature-based machine learning model is utilized. The output information includes predicted click through rate information. A matrix of information is formed using the output information. The matrix is modeled using a latent variable model. Machine learning techniques, which can include feature-based regression techniques, can be used in determining values for unfilled cells of one or more matrices of the model. The latent variable model can be used in determining predicted click through rate information, and in advertisement selection, in connection with serving opportunities.

Figure 1:
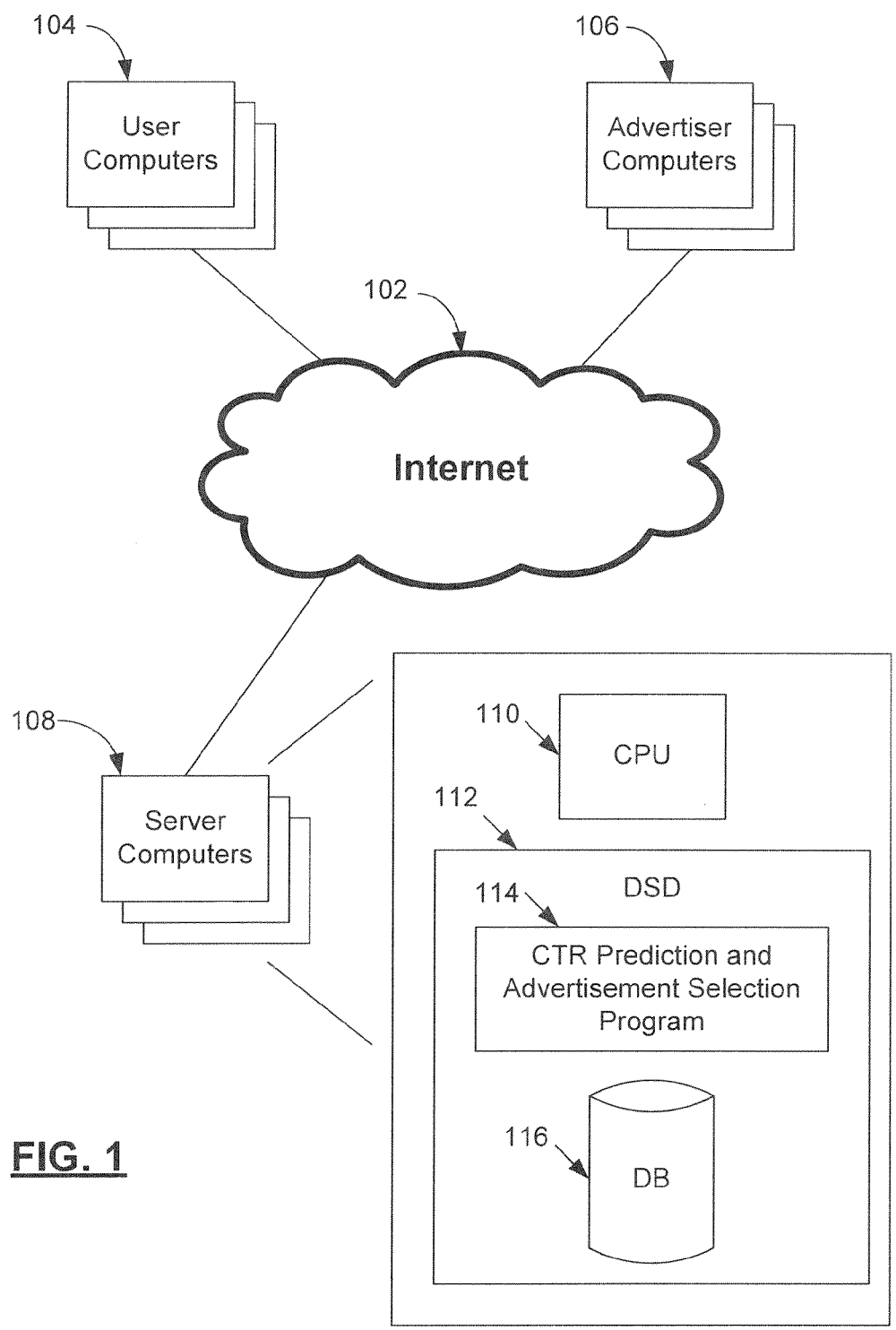
FIG. 1 is a distributed computer system according to one embodiment of the invention.

While the invention is described with reference to the above drawings, the drawings are intended to be illustrative, and the invention contemplates other embodiments within the spirit of the invention.

DETAILED DESCRIPTION

Herein, embodiments of the invention are described primarily with regard to click through rate prediction. However, the invention also contemplates other performance measures that may be associated with advertising, such as conversion rates, etc. Also, herein, the term "click though rate information" broadly includes not only actual predicted click through rates, but also information that can be associated with predicted click through rates, such as scores that correlate with click through rates. Additionally, "click through rates", as the term is used herein, includes approximated click through rates or ranges of click through rates.

Herein, various forms of advertising are contemplated, including video and audio advertising, mobile advertising, etc. Furthermore, herein, the term "advertisements" includes creatives associated with advertisements.

Although latent variable models according to embodiments of the invention are generally described utilizing approximate factorization into two submatrices, embodiments are contemplated that utilize more than two submatrices.

Online advertising often involves selecting a top set of advertisements from a large inventory of advertisements, to serve in association with a particular serving opportunity. Often a set of advertisements must be selected extremely quickly, such as in a matter of milliseconds, based on parameters associated with the serving opportunity. For example, in a sponsored search setting, one or more advertisements may need to be selected and served immediately following a user-entered keyword search query. In non-sponsored search advertising, one or more advertisements may need to be selected based on parameters including, for example, a Web page being visited by a user when the advertisements are to be served. Parameters can also include features, including content-based features, associated with queries, Web pages, etc.

Of course, many additional types of parameters, including targeting parameters, can be associated with a serving opportunity, in both sponsored search and non-sponsored search settings. For example, user-associated parameters can include information relating to the particular user to be served the advertisements, the location of the user (geotargeting), past online behavior of the user, demographics or groups to which the user belongs, etc. Many other types of parameters, including targeting parameters, may also be considered, as known in the art.

Prediction of click through rate associated with serving of advertisements is critical for many purposes, since it is often associated with revenue. For example, in some formulations used in sponsored search, advertisements are selected or ranked for serving based on a formula which may be, or include factors associated with, a predicted click through rate multiplied by an associated advertiser bid amount.

While advertisements may need to be selected in a matter of milliseconds, optimal selection can be very computationally complex, which presents substantial challenges. Offline analysis and calculations, where such can be applied, are very useful in coping with these challenges and providing scalability.

Many parameters and features associated with advertising relate to content, including words or word-based content features. For example, words or word-based features in a query or on a Web page may be compared with words or word-based features in an advertisement, potentially including weights, measures of prominence or importance of words or topics, etc. Moreover, more sophisticated word-based analysis can be performed and utilized, such as topic determination, determinations of importance of particular words or topics, weighting of words or topics, etc.

To facilitate and speed online advertisement selection, indices and index-based techniques can be used. For example, indices can be generated of features, such as content-based and word-based features, associated with queries, Web pages, etc. Furthermore, historical click through rate information can be obtained associated with particular serving opportunity-advertisement instances. This information can be used as input and training information to a feature-based machine learning model to output predicted click through rates associated with new or unobserved instances and combinations.

Output from such a machine learning model includes click through rate information. For example, the output can include click through rate-associated scores, associated with serving opportunity-advertisement instances, and in association with features, such as content-based and word-based features, of advertisements as well as elements of serving opportunities, such as a query or Web page.

It would be advantageous to utilize, in an efficient and scalable way, the output from such a machine learning model, including predicted click through rate information, in predicting click through rates associated with new or unobserved serving opportunity-advertisement instances or combinations.

In some embodiments of the invention, output from such a machine learning model is put into a matrix of information. As just one simple example, the matrix can include query-associated rows and advertisement-associated columns, including content feature-based information as well as predicted click through rate information in association with features. This matrix can then be approximately factorized using a latent variable (or factor) model, such as a probabilistic latent variable model. For example, the matrix can be approximately factorized into a query-associated submatrix and an advertisement-associated submatrix. Another example could include one or more other serving opportunity-associated submatrices (such as a Web page associated submatrix) and one or more advertisement-associated submatrices.

Since historical advertising and click through information are often sparse, the output as initially formed into the matrix of information may have many cells without values. In some embodiments of the invention, machine learning techniques are utilized to predict, determine, or estimate values for unfilled cells in the initially formed matrix. In other embodiments, machine learning techniques are utilized in or after approximate factorization of the matrix, to determine values for and fill in initially unfilled cells in the submatrices.

Latent variable models generally can include modeling a many-dimensional initial matrix as an approximate factorization, or approximate decomposition, into two or more fewer-dimensional matrices. The latent, or unobserved, variable or variables may be a dimension or dimensions in each of the two matrices. The latent variable or variables may not be an explicit dimension or dimensions of the initial matrix, but the initial matrix may contain information which may implicitly, or by inference or other manipulation or determination, allow information to be obtained regarding the latent variable or variables.

Use of a latent variable model can allow simplification of an initial many-dimensional matrix of information, such as a matrix including serving opportunity information, advertisement information, and predicted click through rate information, into an approximate factorization of two or more lower-dimensional matrices, each having one or more latent, or unobserved, variables (or factors) as one or more dimensions. In some embodiments of the invention, submatrices are associated by one or more such latent variables, such as one or more content-based or topical latent variables.

For a new serving opportunity-advertisement instance, features of the particular serving opportunity-advertisement instance can be utilized in performing an appropriate inner product matrix multiplication with regard to the two submatrices, to arrive at a predicted click through rate (or a score relating to a predicted click through rate) associated with the instance based on features determined or known to be associated with the instance.

As such, in embodiments of the invention, output of a machine learning model, which includes not only serving opportunity and advertisement information, but also predicted click through rate information, is put into a matrix format and then modeled using a latent variable model. Values can be determined for unfilled matrix cells using a machine learning technique.

In some embodiments, a regression-based machine learning technique is utilized to determine and fill in unfilled matrix cell values. For example, in some embodiments, a feature-based logistical regression model is utilized. The feature-based regression model can be used to predict or estimate values for latent variables (or factors) associated with the latent variable model utilized to model the matrix. These values can then be used in determining associated predicted click through rate information, which in turn can be used in filling in the unfilled cells. Regression-based models, including regression-based latent variable models, can provide an effective way to manage sparse data situations, and both cold and warm start scenarios.

Some embodiments of the invention include determining a top set of advertisements for serving, or for potential serving, in connection with a particular serving opportunity. This can be described as determining or retrieving the "top k" advertisements in connection with the serving opportunity.

In some embodiments, in connection with a particular serving opportunity, using the latent variable model as described above, predicted click through rate information (such as scores that correlate with predicted click through rates) is generated for many potentially servable advertisements in inventory. Using this information, a top k set of advertisements can be selected. For example, in some embodiments, advertisements may be considered, selected or ranked in connection with a serving opportunity based on a formula such as predicted click through rate multiplied by bid amount, applied for each of many advertisements. The predicted click through rates can be supplied using a latent variable model technique according to embodiments of the invention.

In some embodiments, once a top k set of advertisements is determined in this way, additional machine learning techniques can be used to further refine or re-rank this set, before determining an actual set of advertisements to serve.

As such, some embodiments of the invention include application of a latent variable modeling technique or algorithm to model output from a machine learning model, where the output includes predicted click through rate information. This can be used in providing a scalable algorithm for rapid determination of predicted click through rates for serving opportunity-advertisement instances. Such determined information can in turn be utilized, for example, in determining a top set of advertisements for serving in connection with a particular serving opportunity. In some embodiments, a feature-based regression model can be utilized to till in unfilled matrix cells in connection with the latent variable modeling.

FIG. 1 is a distributed computer system 100 according to one embodiment of the invention. The system 100 includes user computers 104, advertiser computers 106 and server computers 108, all coupled or couplable to the Internet 102. Although the Internet 102 is depicted, the invention contemplates other embodiments in which the Internet 102 is not included, as well as embodiments in which other networks are included in addition to the Internet 102, including one or more wireless networks, WANs, LANs, telephone, cell phone, or other data networks, etc. The invention further contemplates embodiments in which user computers or other computers may be or include wireless, portable, or handheld devices such as cell phones, PDAs, etc.

Each of the one or more computers 104, 106, 108 may be distributed, and can include various hardware, software, applications, programs and tools. Depicted computers may also include a hard drive, monitor, keyboard, pointing or selecting device, etc. The computers may use an operating system such as Windows by Microsoft, etc. Each computer may include a central processing unit (CPU), a data storage device, and various amounts of memory including RAM and ROM. Depicted computers may also include various programming, applications, and software to enable searching, display or presentation of search results, and advertising, such as banner or graphical advertising as well as keyword searching and advertising in a sponsored search context.

As depicted, each of the server computers 108 includes one or more CPUs 110 and a data storage device 112. The data storage device 112 includes one or more databases 116 and a CTR prediction and advertisement selection program 114. The one or more databases 116 may be coupled to the one or more server computers 108, which may include being part of the one or more server computers 108.

The CTR prediction and advertisement management program 114 is intended to broadly include all programming, applications, software and other tools necessary to implement or facilitate methods and systems according to embodiments of the invention. The elements of the program 114 may exist on uric computer or device, or may be distributed among multiple computers or devices.

Figure 2:
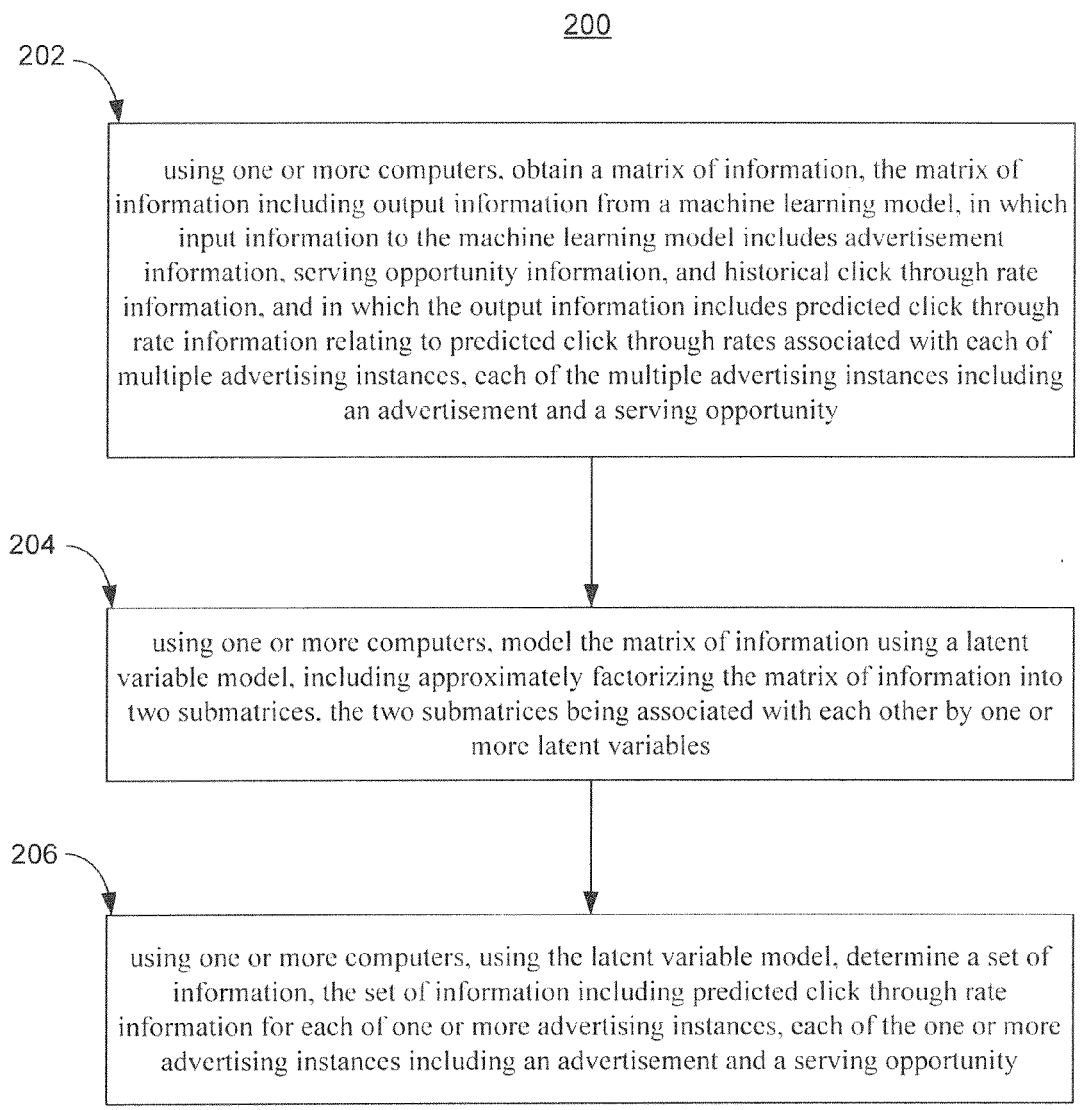
FIG. 2 is a flow diagram of a method according to one embodiment of the invention.

FIG. 2 is a flow diagram of a method 200 or algorithm according to one embodiment of the invention. At step 202, using one or more computers, a matrix of information is obtained, the matrix of information including output information from a machine learning model. Input information to the machine learning model includes advertisement information, serving opportunity information, and historical click through rate information. The output information comprises predicted click through rate information relating to predicted click through rates associated with each of multiple advertising instances, each of the multiple advertising instances including an advertisement and a serving opportunity.

At step 204, using one or more computers, the matrix of information is modeled using a latent variable model, including approximately factorizing the matrix of information into two submatrices, the two submatrices being associated with each other by one or more latent variables.

At step 206, using one or more computers, using the latent variable model, a set of information is determined, the set of information including predicted click through rate information for each of one or more advertising instances, each of the one or more advertising instances including an advertisement and a serving opportunity.

Figure 3:
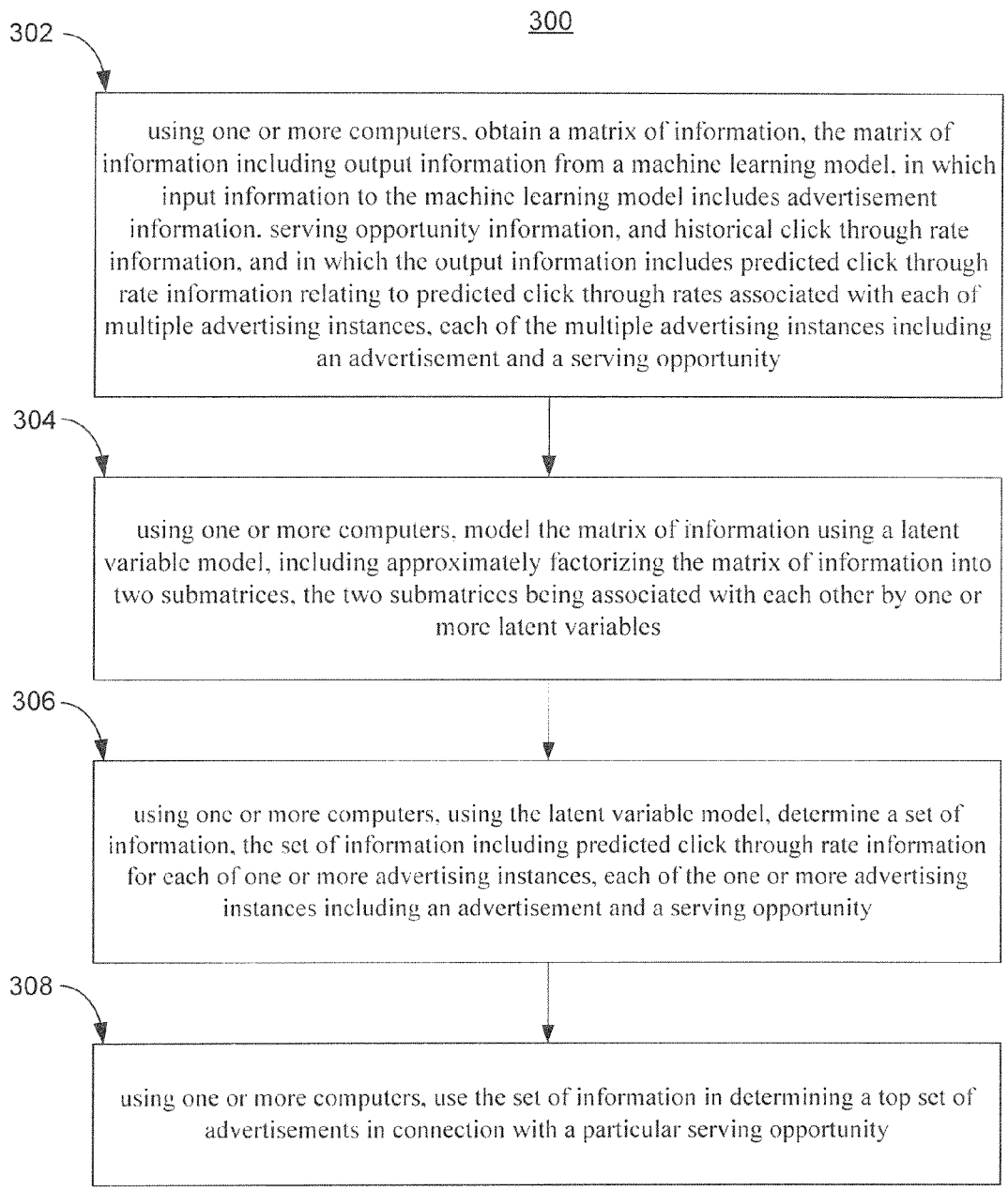
FIG. 3 is a flow diagram of a method according to one embodiment of the invention.

FIG. 3 is a flow diagram of a method 300 according to one embodiment of the invention. Steps 302, 304 and 306 are similar to steps 202, 204 and 206 as depicted in FIG. 2.

At step 308, using one or more computers, the set of information is used in determining a top set of advertisements in connection with a particular serving opportunity.

Figure 4:
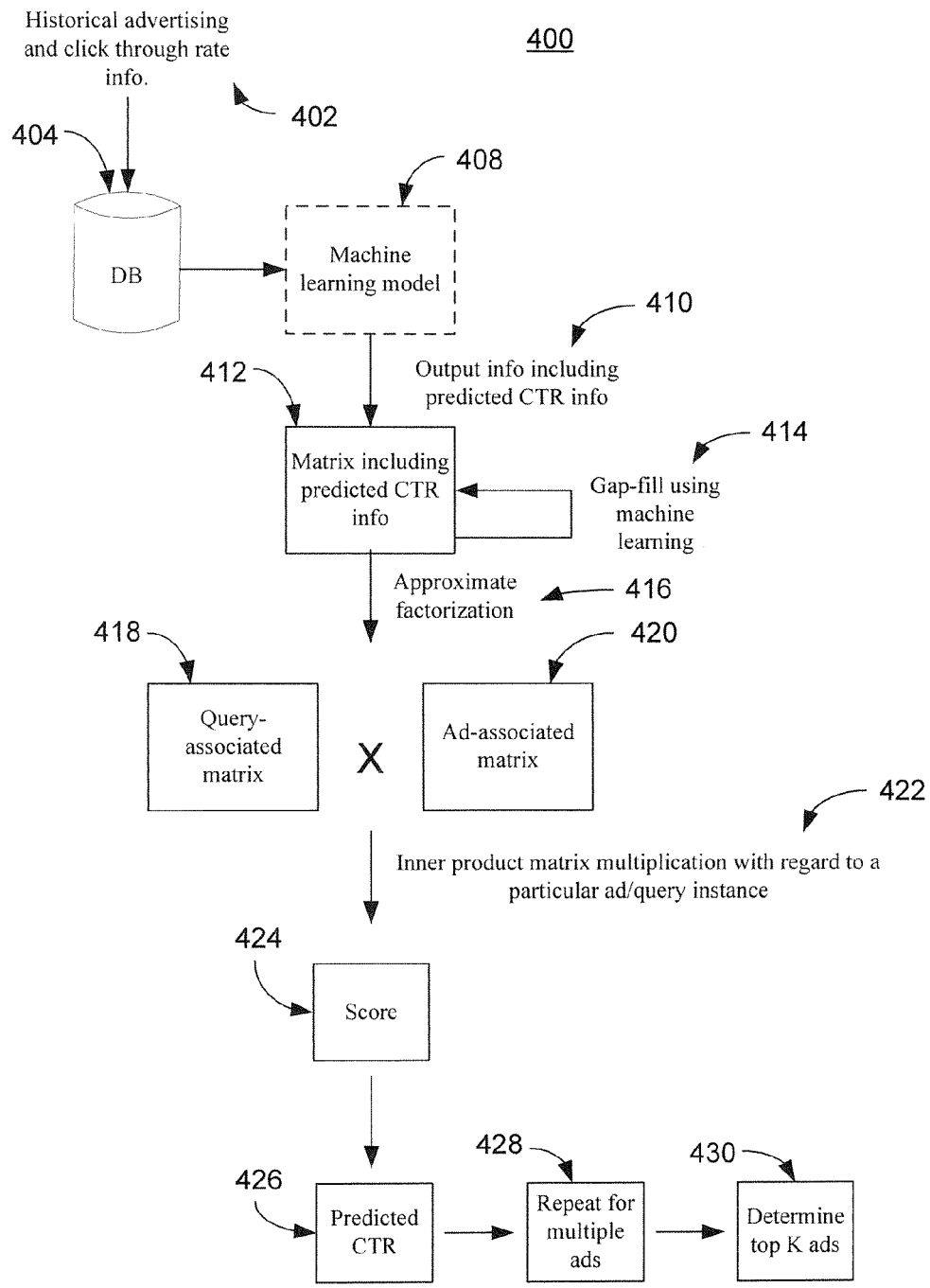
FIG. 4 is a conceptual block diagram illustrating one embodiment of the invention.

FIG. 4 is a conceptual block diagram 400 illustrating one embodiment of the invention. As depicted, historical advertising and click through rate information 402 is stored in a database 404.

The information 402 is among input information for a machine learning model 408. Output information 410 from the machine learning model includes predicted click though rate information associated with multiple instances, each instance including an advertisement and a serving opportunity.

The output information 410 is organized as a matrix 412. The matrix may include many cells without values. In some embodiments, values for such unfilled cells are determined or approximated using a machine learning technique. In some embodiments, a regression-based method is utilized.

Using a latent variable model technique, the matrix 412 is approximately factorized 416 into to two submatrices. The submatrices include a query-associated matrix 418 and an advertisement-associated matrix 420.

In some embodiments, values for such unfilled cells are determined or approximated using a machine learning technique. In some embodiments, a regression-based method is utilized.

For a particular instance, including a query and an advertisement, based on determined associated features, appropriate inner product matrix multiplication 422 of the two submatrices 418, 420 is performed.

In some embodiments, the matrix multiplication 422 results in a score 424 associated with the instance, which score 424 correlates with a predicted click through rate 426 associated with the instance.

At step 428, a predicted click through rate is determined for multiple advertisements.

At step 430, a top k set of advertisements is determined based at least in part on determined predicted click through rates associated with advertisements.

In some embodiments, in performing inner product matrix multiplication, a Weak And, or "WAND", technique may be utilized. The WAND technique can reduce the computational complexity and time that would be required by use of a "brute force", or unsimplified, method. WAND techniques that can be utilized in embodiments of the invention are described in the following published article, which is hereby incorporated herein by reference in its entirety: Andrei Z. Broder, David Carmel, Michael Herscovici, Aya Soffer, and Jason Zien. Efficient query evaluation using a two-level retrieval process. In *CIKM '03*, Nov. 3-8, 2003.

In some embodiments, at runtime, in connection with a particular query (and perhaps other serving opportunity elements such as an associated publisher Web page, user, etc.), predicted click through rate information is determined with regard to many advertisements. The predicted click through rate information can then be used in determining a top set of advertisements for serving in connection with the associated serving opportunity.

For example, in some embodiments, further machine learning techniques may be used to re-rank, in a more granular or further refined manner, the determined top set of advertisements. This re-ranked set, or a sub-set thereof, may be utilized to serve in connection with the serving opportunity. As such, the latent variable model technique, as described, can be used in top k retrieval of advertisements for serving in connection with a serving opportunity.

The foregoing description is intended merely to be illustrative, and other embodiments are contemplated within the spirit of the invention.

The invention claimed is:

1. A method comprising:
using one or more computers, obtaining a matrix of information, the matrix of information comprising output information generated from a machine learning model;
wherein input information to the machine learning model comprises advertisement information, serving opportunity information, and historical click through rate information;
and wherein the output information comprises historical predicted click through rate information relating to predicted click through rates associated with each of a plurality of historical advertising instances, each of the plurality of historical advertising instances comprising an advertisement and an associated serving opportunity;
using one or more computers, modeling the matrix of information using a latent variable model, by approximately factorizing the matrix of information into two submatrices, the two submatrices being associated with each other by one or more latent variables; and
using one or more computers, using the latent variable model, determining a set of information, the set of information comprising predicted click through rate information for a current advertising instance, the current advertising instance comprising an advertisement and an associated serving opportunity.

2. The method of claim 1, comprising:
using the set of information in determining a top set of advertisements in connection with a particular serving opportunity, and
serving a subset of the top set of advertisements in connection with the particular serving opportunity.

3. The method of claim 1, comprising using a machine learning technique in approximating values for a portion of the cells of the matrix of information.

4. The method of claim 1, comprising using a feature-based logistical regression technique.

5. The method of claim 1, comprising:
modeling the matrix of information using a latent variable model, wherein the two submatrices comprise a query-associated matrix and an advertisement-associated matrix; and
for at least a particular query and a particular advertisement, performing an inner product matrix multiplication operation on the two submatrices in determining an associated predicted click through rate, wherein the operation is dependent upon features of the particular query and the particular advertisement.

6. The method of claim 1, wherein the serving opportunity of the current advertising instance comprises a keyword query.

7. The method of claim 1, wherein the serving opportunity of the current advertising instance comprises a Web page.

8. The method of claim 1, wherein the predicted click through rate information for the current advertising instance comprises a score that is associated with a predicted click through rate.

9. The method of claim 1, wherein the predicted click through rate information comprises estimated predicted click through rate information.

10. The method of claim 1, comprising obtaining the matrix of information, wherein input to the machine learning model comprises user information.

11. The method of claim 1, wherein the serving opportunity of the current advertising instance comprises user information associated with a user associated with the serving opportunity.

12. The method of claim 1, comprising modeling the matrix of information using a latent variable model, wherein the one or more latent variables are content-based.

13. The method of claim 1, comprising modeling the matrix of information using a latent variable model, wherein the one or more latent variables are topical.

14. A system comprising:
one or more server computers coupled to the Internet, and one or more databases coupled to the one or more servers;
wherein the one or more server computers are for:
obtaining a matrix of information, the matrix of information comprising output information generated from a machine learning model;
wherein input information to the machine learning model includes advertisement information, serving opportunity information, and historical click through rate information;
and wherein the output information comprises historical predicted click through rate information relating to predicted click through rates associated with each of a plurality of historical advertising instances, each of the plurality of historical advertising instances comprising an advertisement and an associated serving opportunity;
modeling the matrix of information using a latent variable model, by approximately factorizing the matrix of information into two submatrices, the two submatrices being associated with each other by one or more latent variables; and
using the latent variable model, determining and storing in at least one of the one or more databases, a set of information, the set of information comprising predicted click through rate information for a current advertising instance, the current advertising instance comprising an advertisement and an associated serving opportunity.

15. The system of claim 14, comprising:
using the determined set of information in determining a top set of advertisements in connection with a particular serving opportunity, and
serving a subset of the top set of advertisements in connection with the particular serving opportunity.

16. The system of claim 14, comprising using a machine learning technique in approximating values for a portion of the cells of the matrix of information.

17. The system of claim 14, comprising:

modeling the matrix of information using a latent variable model, wherein the two submatrices comprise a query-associated matrix and an advertisement-associated matrix; and for at least a particular query and a particular advertisement, performing an inner product matrix multiplication operation on the two submatrices in determining an associated predicted click through rate, wherein the operation is dependent upon features of the particular query and the particular advertisement.

18. The system of claim 14, wherein the serving opportunity of the current advertising instance comprises a keyword query.

19. The system of claim 14, wherein the serving opportunity of the current advertising instance comprises a Web page.

20. A non-transitory computer readable medium containing instructions for executing a method, the method comprising:

using one or more computers, obtaining a matrix of information, the matrix of information comprising output information generated from a machine learning model;

wherein input information to the machine learning model includes advertisement information, serving opportunity information, and historical click through rate information; and wherein the output information comprises historical predicted click through rate information relating to predicted click through rates associated with each of a plurality of advertising instances, each of the plurality of historical advertising instances comprising an advertisement and an associated serving opportunity;

using one or more computers, modeling the matrix of information using a latent variable model, by approximately factorizing the matrix of information into two submatrices, the two submatrices being associated with each other by one or more latent variables;

using one or more computers, using the latent variable model, determining a set of information, the set of information comprising predicted click through rate information for a current advertising instance, the current advertising instance comprising an advertisement and an associated serving opportunity; and using one or more computers, using the set of information in determining a top set of advertisements in connection with a particular serving opportunity.

\* \* \* \* \*